United States Patent [19]
Andreica

[11] 3,950,664
[45] Apr. 13, 1976

[54] A.C. MOTOR WINDING

[76] Inventor: Vasile Andreica, 43-15 46th St., Sunnyside, N.Y. 11104

[22] Filed: Jan. 9, 1974

[21] Appl. No.: 431,906

[52] U.S. Cl. ................................................. 310/203
[51] Int. Cl.[2] ........................................... H02K 27/02
[58] Field of Search ........... 310/178, 180, 184, 185, 310/189, 195, 198, 199, 202—209, 201; 29/596, 106; 322/93; 242/7.05, 7.08

[56] References Cited
UNITED STATES PATENTS

| | | | |
|---|---|---|---|
| 953,202 | 3/1910 | Hawkins | 310/179 |
| 2,414,571 | 1/1947 | Veinott | 310/198 |
| 2,470,663 | 5/1949 | Stein | 310/180 |
| 2,790,098 | 4/1957 | Nyyssonen | 310/202 |
| 2,898,534 | 8/1959 | Rawcliffe | 310/179 |
| 3,237,034 | 2/1966 | Krasnow | 310/198 |
| 3,321,653 | 5/1967 | Sonoyama | 310/180 |
| 3,439,205 | 4/1969 | Houtman | 310/180 |
| 3,515,922 | 6/1970 | Fong | 310/198 |
| 3,652,888 | 3/1972 | Harrington | 310/198 |
| 3,794,870 | 2/1974 | Broadway | 310/198 |

Primary Examiner—R. Skudy
Attorney, Agent, or Firm—Stephen E. Feldman

[57] ABSTRACT

Windings for an A.C. motor which comprise one basic rectangular or oval coil for each phase, whether single phase, two-phase, or three-phase, each coil being wound into a selected number of loops to establish a corresponding number of poles; also a method of forming such coils and of winding these coils about a motor armature.

6 Claims, 20 Drawing Figures

A.C. MOTOR WINDING

BACKGROUND OF THE INVENTION

This invention relates to a new geometric configuration of the windings for an A.C. motor, for use in the rotor or stator, and also to the method of winding the coils to produce this new configuration. In typical A.C. windings there are as many coils as there are armature poles, regardless of whether the device is a single-phase, a two-phase, or a three-phase motor. Each basic coil consists of one or more loops of wire, wound consecutively until a particular pole is fully wound; the various poles are thus wound separately, and then the coil leads are connected as required to the remaining circuitry.

Of the many types of A.C. motors, including split-phase, capacitor-start, shaded-pole, universal and others, substantially all have some form of wire coils wound about the segments of an armature or alternatively placed in slots of the armature with each coil being a circular oval or rectangular loop. Motor operation and especially windings have been described and discussed in detail in hundreds of texts, articless and patents, of which the following are only a few samples: *Basics of Fractional Horesepower Motors and Repair*, by Gerald Schweitzer, 1960, John F. Rider Publisher, Inc.; *Electrical Engineering Theory and Practice*, by William H. Erickson and Nelson H. Bryant, 1952, published by John Wiley & Sons, Inc.; and U.s. Pat. Nos. 2875,508 and 3628,238. The last two mentioned patents, for example teach the winding of wire into coils, where each coil is to be positioned about one armature segment to form a single pole; however, such pre-formed coils are substantially the same in final structure as coils wound directly into the armature; and in each case one coil is required for each pole. Furthermore, these multiple-looped coils, whether or not pre-formed, are now automatically machine wound in normal mass production. These structures and the methods for producing same have been standard accepted practice for a great many years. The new invention provides new geometric arrangements for the windings of motors, which will save considerable time in the winding operation, and also provides a much less complex structure.

SUMMARY OF THE NEW INVENTION

The new invention relates to a new geometric arrangement of the windings for an A.C. motor, and thus comprises a wound motor armature, a motor having such winding, and a method of forming this new type of winding. The new windings vary in relation to whether the electric current source is single-phase, two-phase, or three-phase, and in relation to the number of slots or segments available in the rotor or stator, and the number of poles desired. A single basic closed-loop coil group will be provided for each phase (1, 2 or 3), regardless of the number of poles to be formed. The number of coils in each group is determined by the equation:

$$N_c = \frac{N_s}{N_{ph} \times N_p},$$

where $N_c$ = No. of coils per coil group
$N_s$ = No. of slots or segments
$N_{ph}$ = No. of phases
$N_p$ = No. of poles per phase.

Thus, for an armature with 36 slots ($N_s$), using three-phase current, ($N_{ph}$), and having four poles per phase ($N_p$), $N_c = 36/3 \times 4 = 3$ coils per coil group.

Each coil is wound about the armature, traversing slots that are generally symmetrically spaced and forming poles of the armature segments that are partially circumscribed by loops of coil. Preferably every slot is occupied by one coil, with coils of one coil group lying in adjacent slots.

Also according to this invention the method of forming the new windings comprises first determining the proper length of each basic coil which is the same for all coils in a coil group; then forming each coil into a closed, generally rectangular loop, and forming as many coils as required for each coil group. Then each coil is placed such that two portions of the coil lie in two spaced slots with an arc portion joining the two portions; then remaining portions of the coil are positioned in other slots until the selected number of poles is defined and the whole loop is utilized. Thus instead of winding a coil completely about each armature segment to form each pole, each coil is a pre-formed closed loop that is wound partially once about each of a plurality of segments to define a corresponding number of poles for one-phase. The winding may be symmetric or assymmetric depending on the number of slots, poles, and phases.

DESCRIPTION OF THE PREFERRED EMBODIMENT

Figure 1:
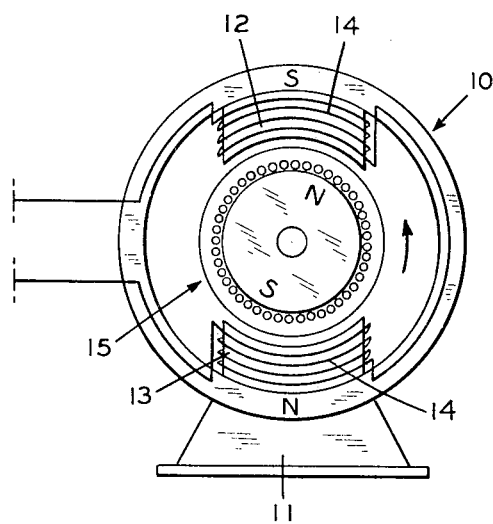
FIG. 1 is a sectional, front elevation view of an electric motor, showing its stator, rotor, and winding components.

FIG. 1 shows basic components of a simple AC motor including the stator 10 mounted to a base 11 with poles 12 and 13 and windings 14 on the poles, and a rotor 15. Obviously a great many variations are possible as regards the number and arrangement of poles and the types of windings and materials selected.

Figure 2:
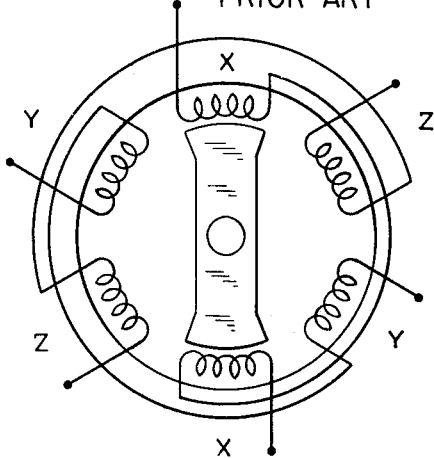
FIG. 2 is a schematic view of an electric motor stator-winding and rotor.
Figure 3:
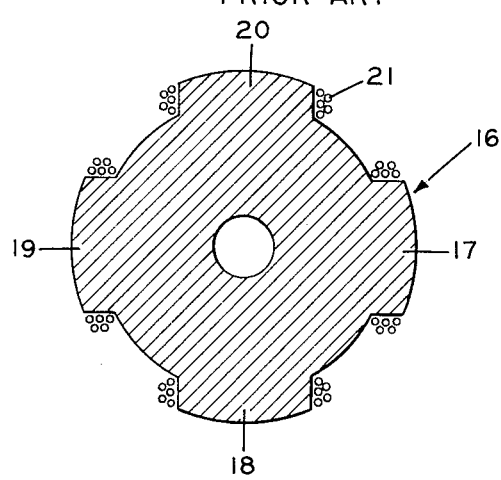
FIG. 3 is an elevation view in section of a prior art rotor with windings about its poles.
Figure 4:
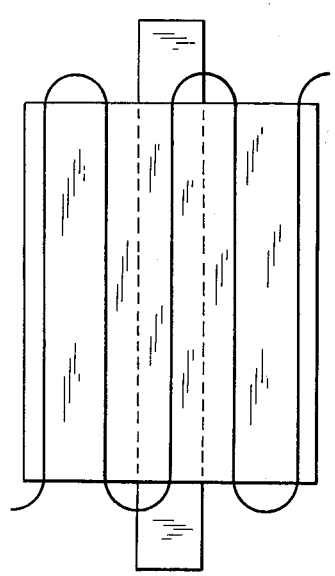
FIG. 4 is an elevation view of a rotor showing a partial winding according to this invention.

FIG. 2 shows another schematic view of the windings and rotor of a three-phase AC motor where the two poles X are electrically connected, and the two poles Y and also poles Z are similarly connected. While the manner of operation of a three-phase motor is well-known from numerous references some of which are mentioned above, it should be noted that each of the six poles shown in this Figure is formed by having continuous and consecutive loops formed of a single strand about each pole. This type of winding is further illustrated in FIG. 3 where rotor 16 has poles 17–20, and each pole has multiple, consecutive windings about that pole as shown typically by wires 21 around pole 20. The new invention as will be described in future paragraphs, utilizes coils formed as specific closed loops that are wound about an armature to define poles circumscribed by the wound loops, as generally indicated in FIG. 4, except that each pole is not wound with a multiplicity of consecutive loops as shown in FIGS. 1–3.

Figure 5:
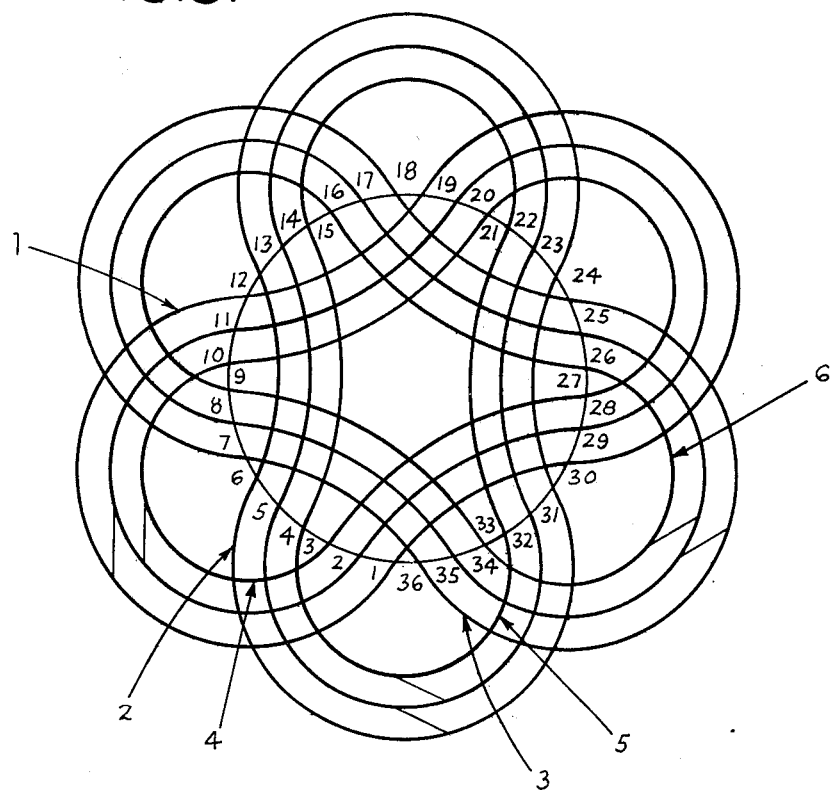
FIG. 5 is an end view of windings of a three-phase, four-pole motor according to this invention.

FIG. 5 for example, shows the end view of windings for a three-phase, four-pole motor which has three coils per basic coil group. Lead 1 for example, traverses slot 12 and then 19 and then 30, and then 1 and again 12; thus this single continuous closed loop coil is wound about the armature in selected slots to define four poles. In this particular design, there are three coils in each coil group such that coils traversing slots 10, 11 and 12 comprise one group connected to lead 1, while coils traversing slots 4, 5 and 6 comprise a second coil group connected to lead 2, and coils traversing slots 34, 35 and 36 comprise the third coil group for the third phase which are connected to lead 3. This same winding is shown developed in a flat projection of an otherwise circular cylindrical armature, which may be a rotor or a stator. In this particular device, the armature has thirty-six slots, and the equation shown above on page 3 would be calculated with $N_s = 36$, $N_{ph}=3$, $N_p=4$, with the result that $N_c$, the number of coils per group equals 3. As shown in these FIGS. 5 and 6, each basic coil group does comprise three coils which follow generally parallel paths together. It should also be noticed about these Figures that this coil winding arrangement is symmetrical in all respects.

Figure 6:
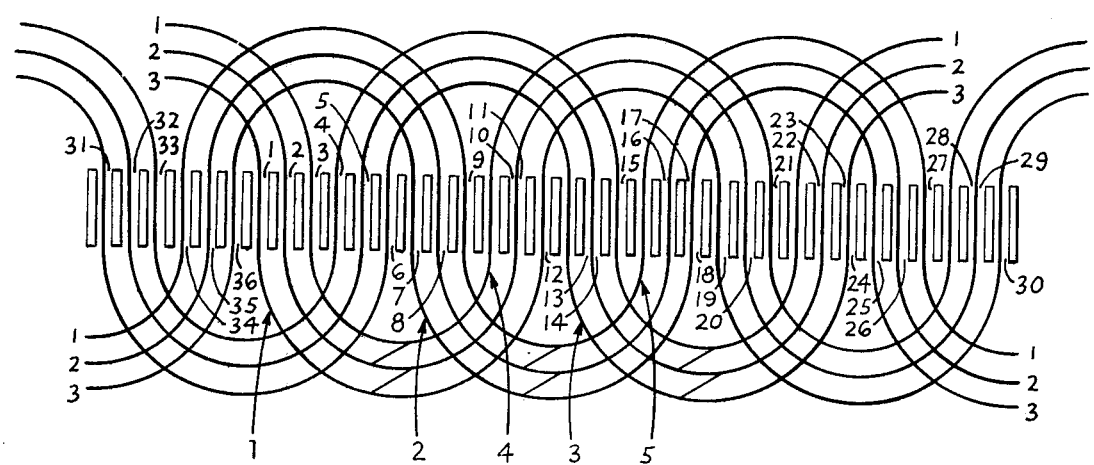
FIG. 6 is an elevation view of the armature in FIG. 5 shown developed in a flat configuration.
Figure 7:
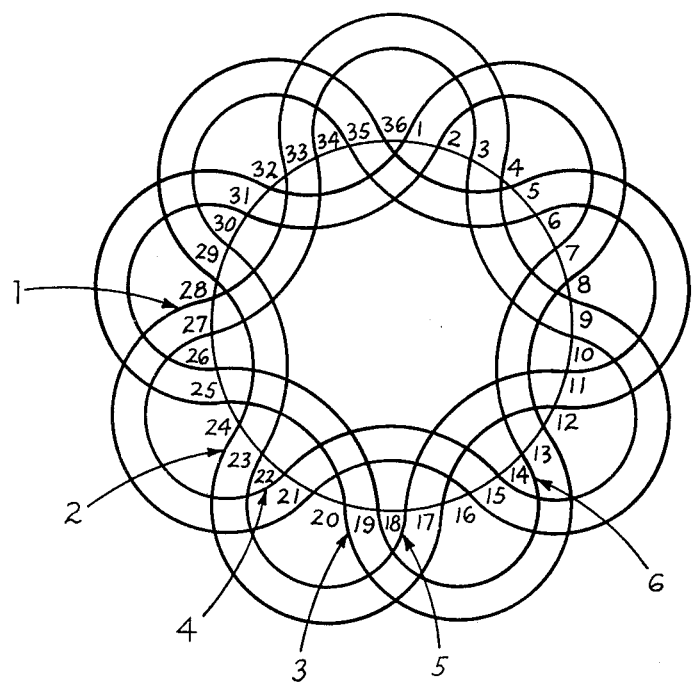
FIG. 7 is an end view of windings of a three-phase, six-pole motor according to this invention.
Figure 8:
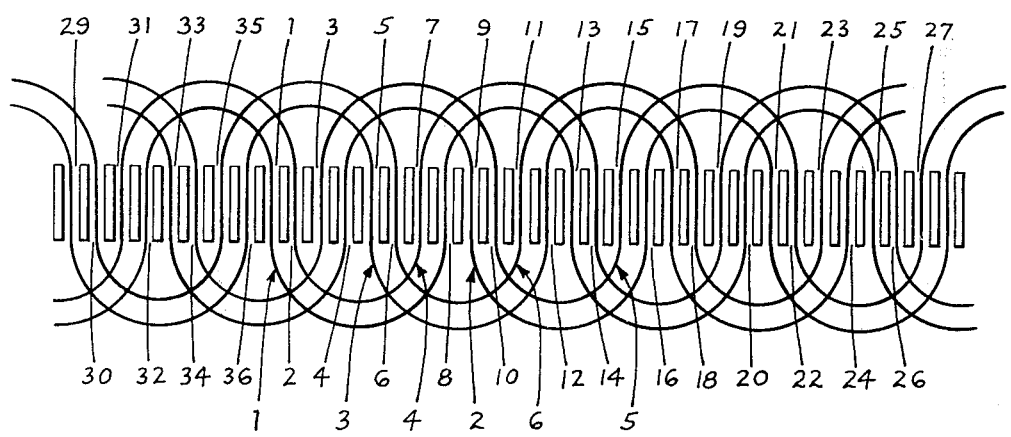
FIG. 8 is an elevation view of FIG. 7, similar to FIG. 6.

FIGS. 7 and 8 shown end and elevational views of the windings of a three-phase, six-pole motor wound somewhat similarly to the motor of FIGS. 5 and 6. Here there are only two coils per basic coil group, but each coil is wound to define six poles with a sample pair of coils traversing slots 1 and 2, then 7 and 8, then 13 and 14, then 19 and 20, then 25, 26 and finally 31 and 32. This winding arrangement is also symmetrical and can be calculated according to the equation mentioned above.

Figure 9:
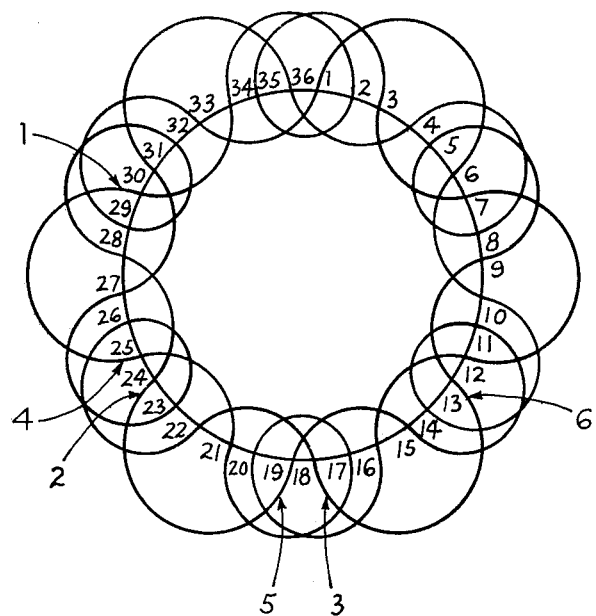
FIG. 9 is an end view of windings of a three-phase, eight-pole motor according to this invention.
Figure 10:
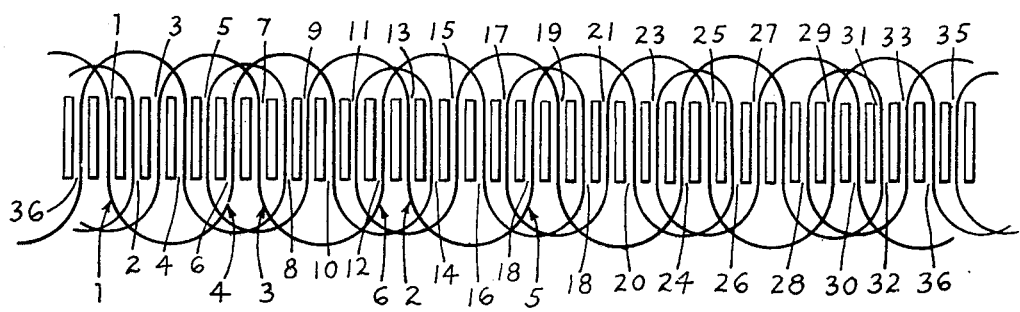
FIG. 10 is an elevation view of FIG. 9, similar to FIG. 6.

FIGS. 9 and 10 show a somewhat different motor which is a three-phase, eight-pole motor with non-symmetric windings and having one coil per coil group. The armature still has 36 slots; in order to provide a proper distribution of the eight-poles for each phase, the coils are positioned in the slots shown with the arrangement that results indicated.

Figure 11:
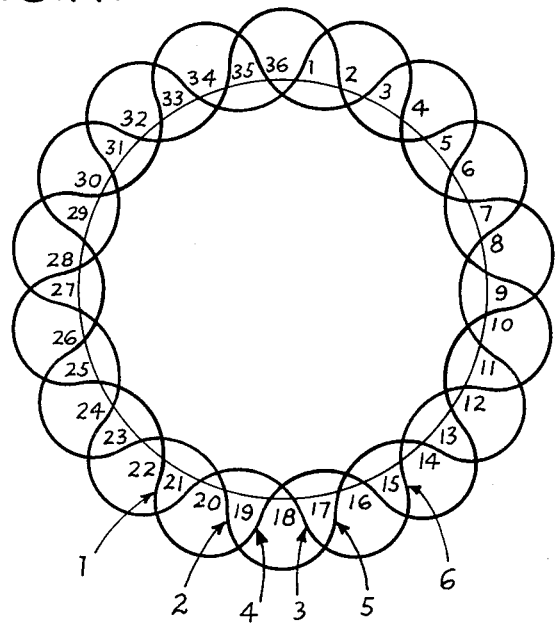
FIG. 11 is an end view of windings of a three-phase, 12-pole motor according to this invention.
Figure 12:
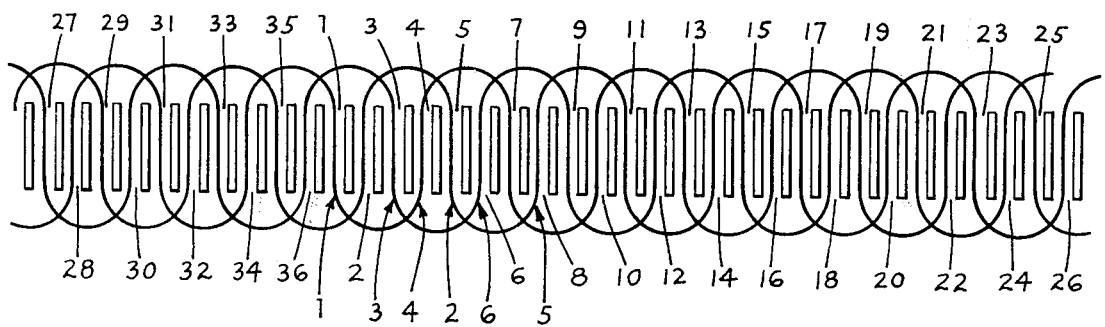
FIG. 12 is an elevation view of FIG. 11, similar to FIG. 6.

FIGS. 11 and 12 show another three-phase motor having 12 poles and one coil per coil group with the overall geometric design shown as indicated. In each of the above winding arrangements and in other designs, according to this invention but which are not shown, the coils are wound to define within the loops specific armature poles, somewhat similar to the arrangement shown in FIG. 4 where a continuous strand is wound about different poles, in specific contrast to the prior art FIGS. 1–3 where a plurality of coils are formed about and around each pole.

Figure 13:
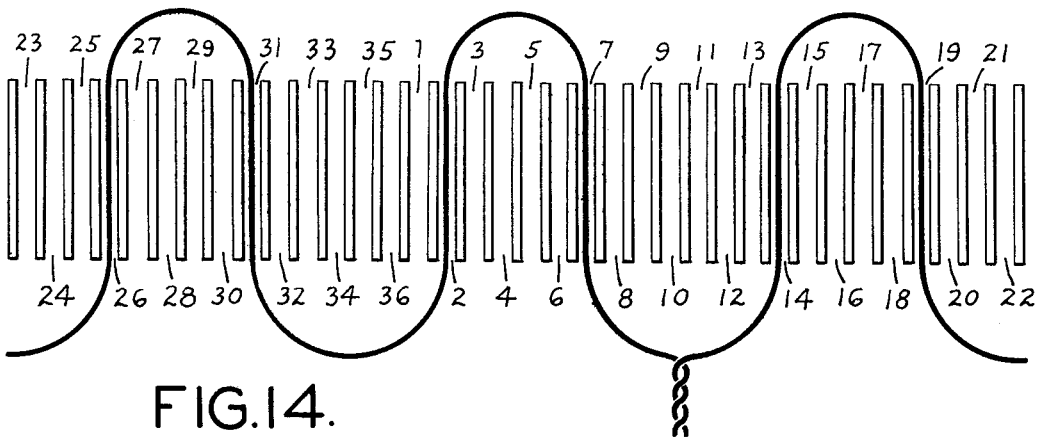
FIGS. 13–17 are schematic views showing steps in forming a coil of the new invention.
Figure 14:
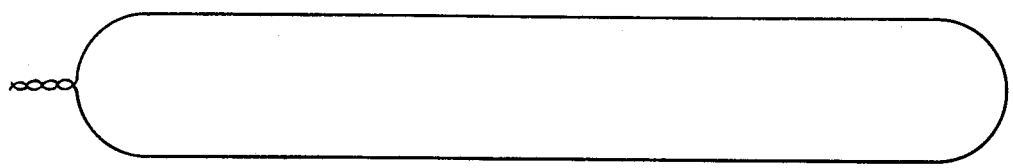
Figure 15:
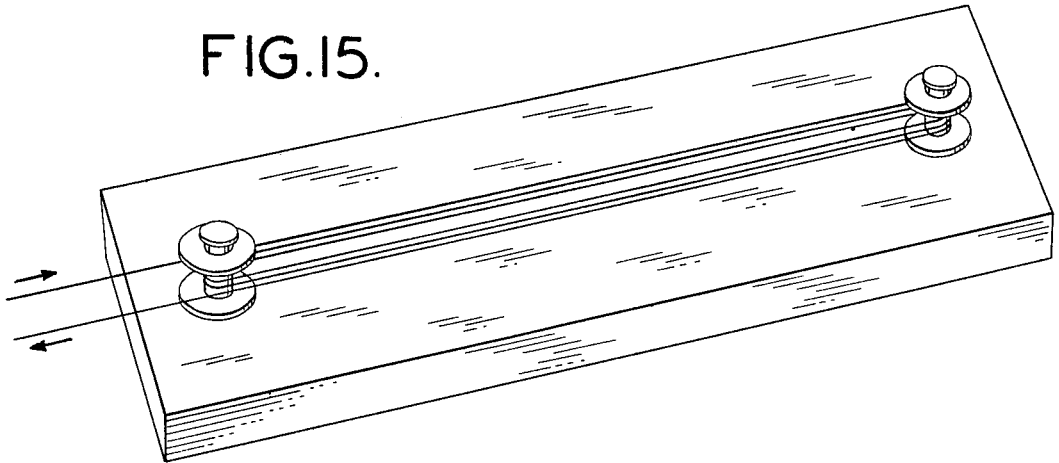
Figure 16:
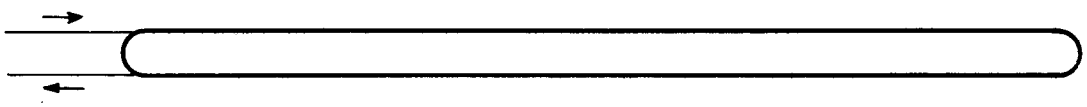
Figure 17:
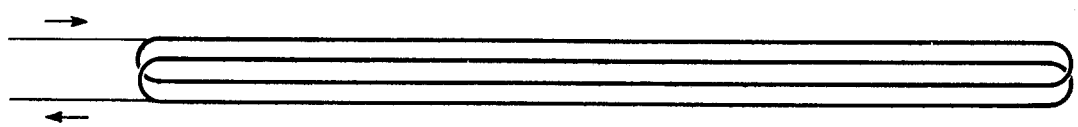

A different aspect of the present invention is the method of forming the closed loop coils prior to the time they are wound about an armature to form the new winding. After the number of poles is determined, such as six-poles a strand of wire may be positioned in the slots of an armature as generally shown in FIG. 13 for that particular winding, to determine the proper length for a strand of wire to be used for this particular coil. Next, FIG. 14 shows the same strand formed into a generally rectangular loop, and FIGS. 15–17 show steps for forming two or more coils where the basic coil group comprises more than one.

Figure 18:
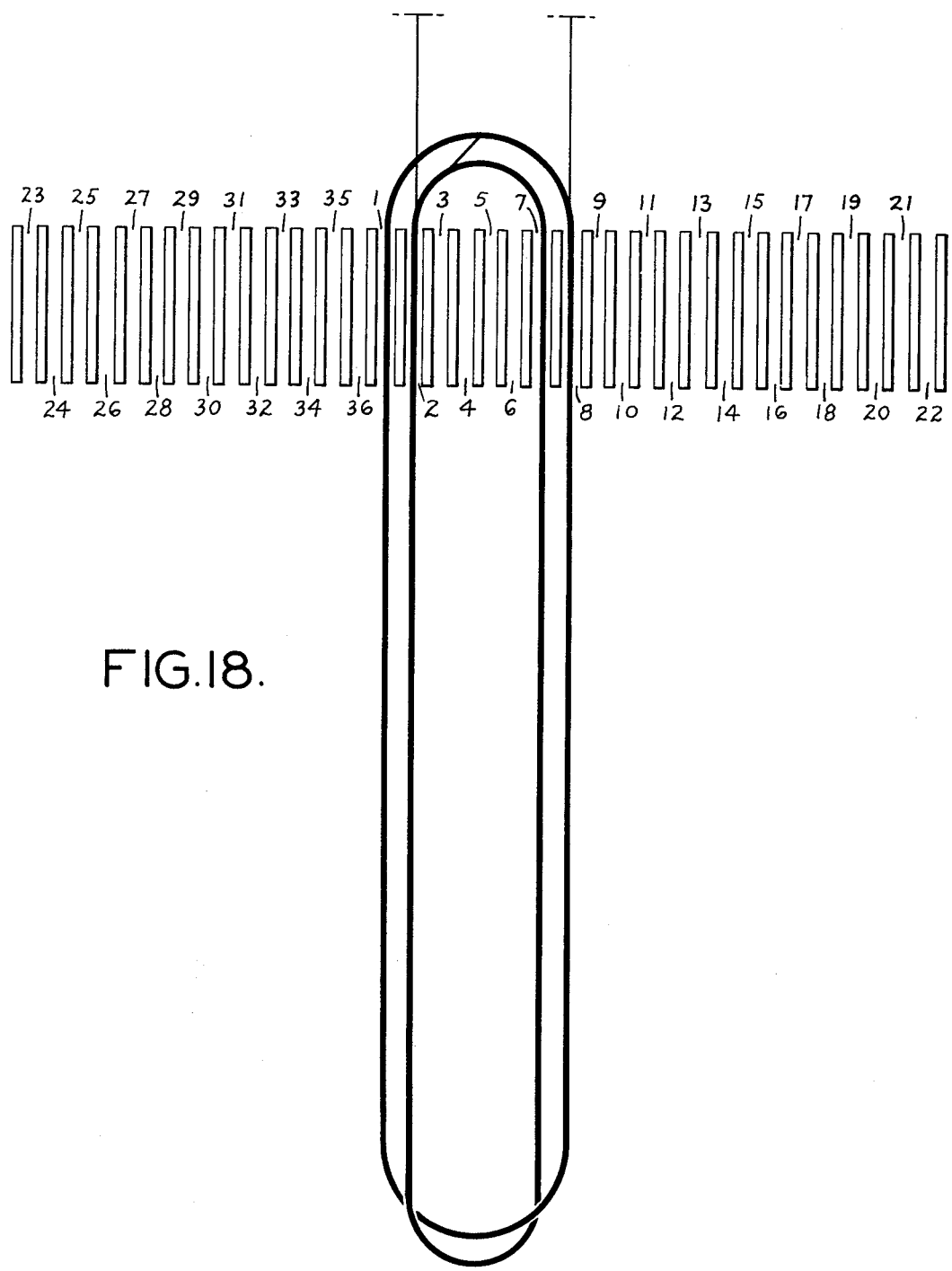
FIGS. 18–20 are schematic views showing steps in winding a sample of the new coil in the slots of an armature.
Figure 19:
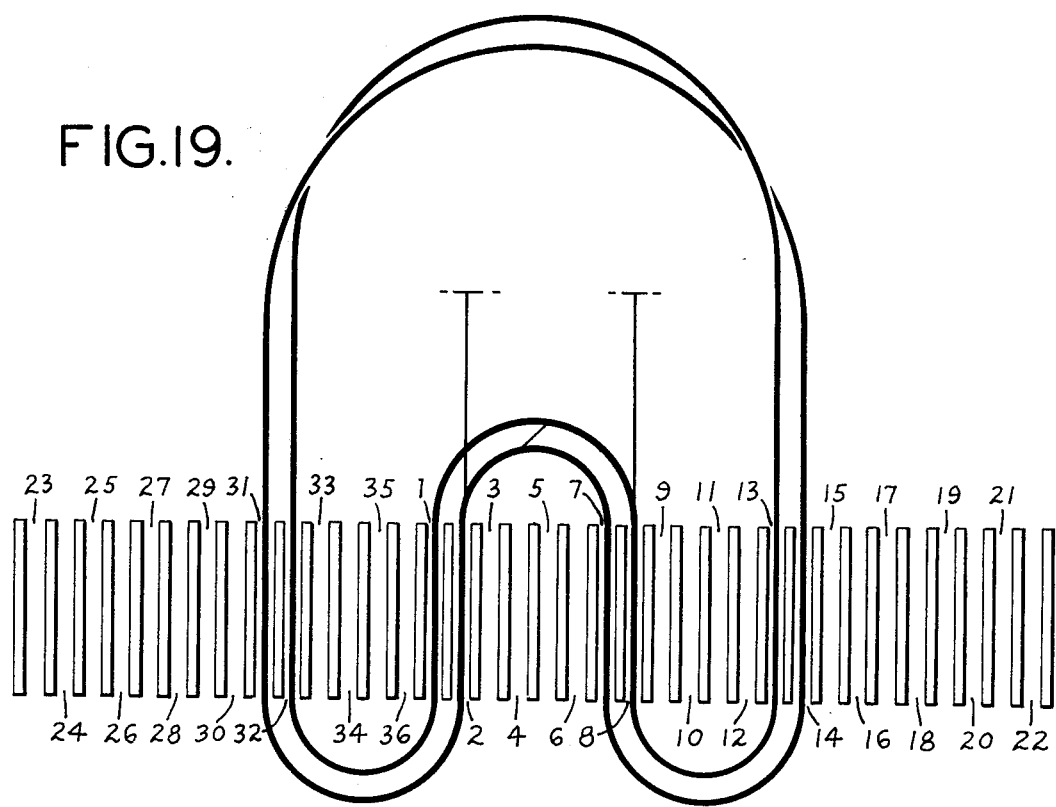
Figure 20:
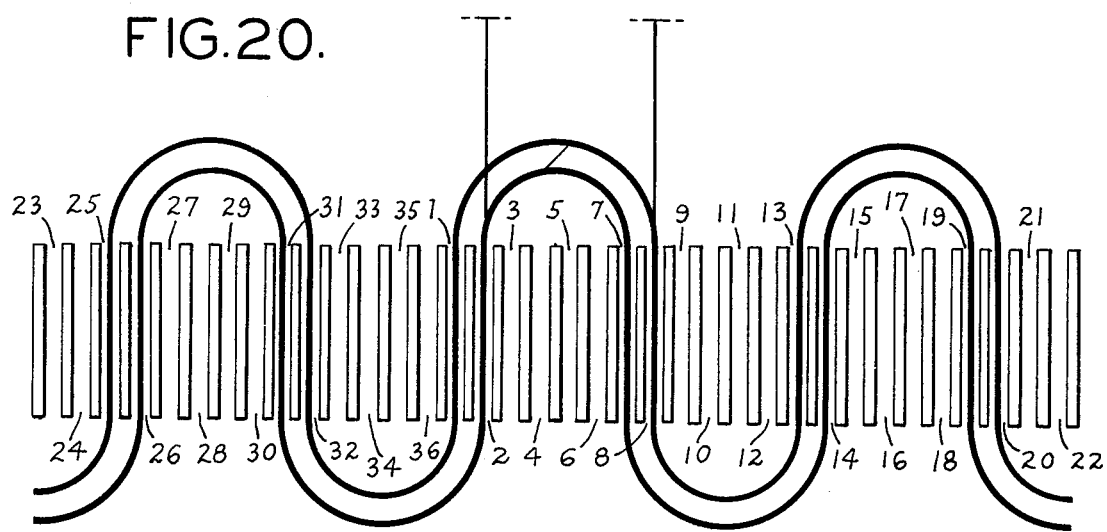

FIGS. 18–20 then show typical steps for winding one of the above formed coil groups about the armature to form the poles. Specifically FIG. 18 shows a two-coil, coil group positioned in slots 1, 2 and 7 and 8; then FIG. 19 shows the left leg of the coil extending downward from slots 1 and 2 is wound back into slots 31 and 32, while the right side is wound into slots 13 and 14. Next, FIG. 20 shows these coils further wound in slots 25, 26 on the left and slots 19 and 20 on the right which completes the winding about this particular armature having 36 slots, and provides six-poles for this particular coil. It might be noted that the winding shown in FIG. 20 is substantially the same as the winding shown in FIG. 8 as regards the coils in slots 1 and 2 of FIG. 8 for the three-phase, six-pole motor shown therein.

It should be obvious that a great many different numbers of slots may be selected for the armature and also the number of poles may vary and the number of coils per coil group. The following additional terminology is suggested to render the descriptions above more easily understood. Where there are three coils corresponding to three-phase current, for example, each coil should be considered a basic coil or group of coils which may comprise one or more component coils; each component coil could comprise a plurality of insulated wires bundled together. The stator or rotor element which receives this new winding has a cylindrical surface defining thereon a plurality of axial segments or slots about which the coils are wound, but with only one component coil in each slot or between any pair of adjacent segments. Accordingly a typical component coil has axial portions that lie adjacent said segments and circumferential portions that join adjacent axial portions.

While specific embodiments of the invention have been described, it will be appreciated that many modifications thereof may be made by one skilled in the art which falls within the true spirit and scope of the invention.

I claim:

1. In an AC motor including cylindrical stator and rotor elements, the improvement in combination therewith of windings wound on at least one of said elements to form a plurality of poles, each element thus wound having an annular surface defining thereon a plurality of equally spaced-apart slots oriented generally axially of said surface, said windings comprising only one basic coil for each phase, each coil being a continuous closed wire loop defining a continuous path which never intersects its own path, circumscribing said annular surface of said element, made of axial portions lying in said slots, and circumferential portions joining axial portions, two first and second axial portions being connected by only one circumferential portion and third and fourth axial portions joined to each of said first and second axial portions by only one circumferential portion, each of said circumferential portions being connected to said first and second axial portions at the opposite end of said first and second axial portions from the circumferential portion connecting said first and second axial portions, each of said slots having only one wire of said basic coil therein and each basic coil being positioned in the slots of each pole and the number of basic coils being equal to the number of phases.

2. Apparatus according to claim 1 wherein each basic coil corresponding to one phase comprises a group of one or more component coils, and only one axial portion of any component coil lies in a slot, and the number of poles to be formed is predetermined, then the number of component coils ($N_c$) equals $N_s/(N_{ph})$, where $N$ = the total number of slots on the wound element, $N_{ph}$ = the number of phases of the current, and $N_p$ = the total number of poles to be formed.

3. Apparatus according to claim 2 wherein $N_s=36$, $N_{ph}=3$, and $N_p$ and $N_c=$ one of the following pairs 4 and 3, 6 and 2, 12 and 1, respectively.

4. Apparatus according to claim 1 wherein the windings as defined are wound on the rotor only.

5. Apparatus according to claim 1 wherein the windings as defined are wound on the stator only.

6. Apparatus according to claim 2 wherein $N_s=36$, $N_{ph}=3$, $N_p=4$, and $N_c=3$.

* * * * *